US007537202B2

(12) United States Patent
Watanabe

(10) Patent No.: US 7,537,202 B2
(45) Date of Patent: May 26, 2009

(54) ACTIVE VIBRATION DAMPING DEVICE

(75) Inventor: Yoshinori Watanabe, Inuyama (JP)

(73) Assignee: Tokai Rubber Industries Ltd., Komaki-shi (JP)

(*) Notice: Subject to any disclaimer, the term of this patent is extended or adjusted under 35 U.S.C. 154(b) by 471 days.

(21) Appl. No.: 11/268,651

(22) Filed: Nov. 8, 2005

(65) Prior Publication Data

US 2006/0097437 A1 May 11, 2006

(30) Foreign Application Priority Data

Nov. 11, 2004 (JP) .............................. 2004-328190

(51) Int. Cl.
*F16F 5/00* (2006.01)
*F16F 9/32* (2006.01)
(52) U.S. Cl. .............................. 267/140.14; 267/140.15
(58) Field of Classification Search ............ 267/140.14, 267/140.15, 140.11, 140.12, 219; 335/255, 335/261, 262, 279
See application file for complete search history.

(56) References Cited

U.S. PATENT DOCUMENTS

| 5,439,204 | A | * | 8/1995 | Yamazoe et al. | ....... | 267/140.14 |
| 6,406,010 | B1 | * | 6/2002 | Yano et al. | ............. | 267/140.14 |
| 6,527,262 | B2 | * | 3/2003 | Hagino et al. | .......... | 267/140.14 |
| 2007/0138719 | A1 | * | 6/2007 | Ichikawa et al. | ....... | 267/140.14 |
| 2007/0285196 | A1 | * | 12/2007 | Uni | ............................. | 335/262 |

FOREIGN PATENT DOCUMENTS

| JP | A-6-264955 | 9/1994 |
| JP | A 9-49541 | 2/1997 |
| JP | A-10-331908 | 12/1998 |
| JP | 11162733 A | * 6/1999 |
| JP | A 2000-283214 | 10/2000 |
| JP | A 2002-25820 | 1/2002 |

OTHER PUBLICATIONS

Machine translation of JP 11-162733.*

* cited by examiner

*Primary Examiner*—Thomas J Williams
(74) *Attorney, Agent, or Firm*—Oliff & Berridge, PLC

(57) ABSTRACT

An active vibration damping device wherein first and second mounting members are linked by a main rubber elastic body, a pressure receiving chamber having a non-compressible fluid sealed therein is defined by the main rubber elastic body at one part and by an oscillation member in the other part. A solenoid actuator designed with a movable element positioned inserted into a guide hole of a stator having a yoke member is attached about a coil to form a stator-side magnetic path with the guide hole lying on its center axis, so that current passed through the coil creates actuating force in the axial direction between the stator and the movable element. The stator of the solenoid actuator is affixed to the second mounting portion and the movable element is attached to the oscillation member. A bias urging assembly is disposed for urging the movable element in one axis-perpendicular direction to the stator.

7 Claims, 8 Drawing Sheets

ACTIVE VIBRATION DAMPING DEVICE

INCORPORATED BY REFERENCE

The disclosure of Japanese Patent Application No. 2004-328190 filed on Nov. 11, 2004 including the specification, drawings and abstract is incorporated herein by reference in its entirety.

BACKGROUND OF THE INVENTION

1. Field of the Invention

The present invention relates to an active vibration damping device for use as an automotive engine mount, body mount, or the like in order to produce active or countervailing damping action of vibration to be damped, and relates in particular to an active vibration damping device adapted to provide active vibration damping action by means of employing an oscillation member to constitute part of the wall of a pressure receiving chamber with a non-compressible fluid sealed therein, and controlling pressure within the pressure receiving chamber by means of exciting actuation of the oscillation member with a solenoid type actuator.

2. Description of the Related Art

Fluid filled type active vibration damping devices are known as one type of vibration damping device used as a vibration damping connector or vibration damping support interposed between components making up a vibration transmission system. Such a vibration damping device typically comprises a pressure receiving chamber a portion of whose wall is composed of a main rubber elastic body linking a first mounting member and a second mounting member; and an oscillation member making up part of the wall of the pressure receiving chamber, and actuated from the outside under the control of an actuator. Such devices are taught in JP-A-9-49541 and JP-A-2000-283214, for example. In this kind of active vibration damping device, pressure within the pressure receiving chamber is regulated according to the input vibration to be damped, so as to be able to cancel out the input vibration to provide active vibration damping action.

In fluid filled type active vibration damping devices of this kind, in order to achieve effective damping action, it is important to control pressure fluctuations within the pressure receiving chamber to frequency and phase corresponding with high accuracy to input vibration.

The actuator used to apply actuating force to the oscillation member is favorably a solenoid type actuator, as disclosed in JP-A-9-49541 and JP-A-2000-283214 above. Such an actuator typically has a structure wherein a movable member is positioned displaceably inserted in a stator having a yoke member is attached about a coil to form a stator-side magnetic path, and current is passed through the coil to create actuating force in the axial direction between the stator and the movable element.

In the event that a solenoid actuator of this kind is to be employed, for example, in an automotive engine mount or other vibration damping device, there is a problem in that the actuator, and hence the vibration damping device itself, may not readily afford satisfactory durability and reliability with regard to operating performance. This is due to the fact that, while in the case of an automotive engine mount, it is necessary for the device to be able to provide continuous vibration damping for a predetermined time period in a high frequency range of several tens of Hz and above for an extended time of several years or more, a typical solenoid actuator cannot consistently maintain such continuous operation in a high frequency range for an extended period.

With the foregoing in view, it has been contemplated to attach a guide sleeve to the stator to form a guide hole with good sliding on the inside peripheral face of the guide sleeve, so as to provide a guide mechanism that will lessen the damage in the event that the movable element should come into contact with the inside face of the guide hole.

However, since the interval between the movable element and the guide hole consists of a very small gap all the way around, it is difficult to avoid the movable element coming into contact with the inside face of the guide hole, due to error in component tolerances and assembly, or change of parts over time. Particularly in vibration damping devices such as those discussed above, even if the actuator by itself is a high precision component, it is nevertheless extremely difficult to maintain a high degree of accuracy of relative position of the stator and the movable element while installed in the vibration damping device, so contact of the movable element with the inside face of the guide hole is unavoidable in actual practice.

The reason for this lies in the fact that vibration damping devices typically employ rubber elastic elements for displaceably supporting the oscillation member, but since rubber elastic elements experience molding shrinkage, it is not possible to control their dimensions with high accuracy as with metal fittings. Thus, in a vibration damping device, it is not possible to avoid positional deviation in the axis-perpendicular direction of the stator affixed to the second mounting member and the movable element attached to the oscillation member, and contact between the movable element and the stator due to positional deviation is inevitable.

In most instances, contact between the movable element and the stator in the axis-perpendicular direction occurs with the upper end or lower end of the movable element as the point of contact with the stator. However, when the movable element undergoes relative displacement and inclines in the twisting direction with respect to the stator, a first axial end and the other end of the movable element mutually come into proximity with the stator on opposite sides in the axis-perpendicular direction, as a result of which magnetic force acting on both ends serves to produce further inclination of the stator.

Such inclination of the stator in many instances results in contact of the movable element and the stator occurring as point contact at both axial ends. As a result, there is appreciable contact plane pressure in the areas of contact of the movable element with the stator, so that wear is accelerated in the contact areas, and the problems of insufficient durability and inconsistent operating characteristics tend to occur.

Additionally, it is typical to subject the contact areas of the movable element and the stator to slide coating with fluororesin in order to improve slide, to corrosion resistant coating by means of plating process, or to various other coatings. At contact points resulting from inclination of the movable element as discussed above, such coatings tend to peel due to scratching, thus exacerbating the problems of poor durability and operational stability.

To address such problems, JP-A-2002-25820 proposes to furnish a bearing composed of a number of rigid spheres and an elastic member, to provide a structure for controlling bias of the movable element. However, this bearing has a complicated structure and numerous parts, and thus would be difficult to employ in terms of the production process and production costs. Additionally, the dimensional accuracy of the bearing per se and the assembly accuracy when attaching the bearing to the actuator would tend to be problematic. Thus, even if such a bearing were employed, it would not necessarily translate to effective results in terms of durability and operational stability.

SUMMARY OF THE INVENTION

It is an object of the present invention to provide an active vibration damping device of novel construction, which has a solenoid actuator, and which is capable of providing consistent operating characteristics and excellent durability of the movable element, while exhibiting the desired active vibration damping ability consistently over an extended period.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides an active vibration damping device comprising: a first mounting member and a second mounting member, the members attachable respectively to components linked to each other to make up a vibration transmission system; a main rubber elastic body elastically linking the first and second mounting members, defining one portion of a wall of a pressure receiving chamber having a non-compressible fluid sealed therein; an oscillation member defining another portion of the wall of the pressure receiving chamber; a solenoid actuator including: a stator having a coil and a yoke member attached about the coil to form a stator-side magnetic path with a guide hole extending along a center axis thereof; and a movable element positioned inserted into the guide hole of the stator so that actuating force in an axial direction is create between the stator and the movable element by means of supplying electrical current to the coil, the stator of the solenoid actuator being affixed to the second mounting member and the movable element being attached to the oscillation member so as to actively control pressure in the pressure receiving chamber by exciting actuation of the oscillation member, and a bias urging assembly for urging the movable element in one direction in an axis-perpendicular direction with respect to the stator.

In the active vibration damping device constructed in accordance with this mode, by employing the bias urging assembly to urge the movable element to one side in the axis-perpendicular direction, it is possible to suppress tilt of the movable element with respect to the stator. With this arrangement, it is possible to avoid the conventional problem of the upper and lower ends of the movable element becoming biased in the axis-perpendicular direction so as to come into point contact against the inner peripheral face of the guide hole of the stator, thereby preventing an increase in localized contact pressure or sticking of the movable element against the stator so that smooth operation is realized. In particular, even where the contact faces of the movable element and the stator are coated, the low friction slide characteristics or corrosion resistance characteristics provided by the coating layer are exhibited consistently for an extended period.

Additionally, by more actively subjecting the movable element to urging force to one side in the axis-perpendicular direction, the movable element can be made to undergo displacement by parallel motion in the axis-perpendicular direction overall with respect to the movable element, and the movable element made to come into generally linear contact in the axial direction with respect to the guide hole inside face. By means of this linear contact, the guiding action of the guide hole formed in the stator on the movable element can be utilized more effectively, to achieve more consistent axial displacement of the movable element, as well as to more reliably avoid point contact of the movable element against the guide hole inside face, so that stable operating characteristics can be achieved over an extended period.

As will be understood from the preceding discussion, as compared to a conventional construction whose design simply contemplates avoiding contact of the movable element against the stator, the present invention is based on the opposite idea, namely, of actively imparting the movable element with force in the direction of contact with the stator. The invention is based upon the novel technical concept that, even if the movable element should come into contact with the stator, where this contact is realized over a wide area and has a stabilizing effect, it is possible to reduce or avoid the conventional problems of diminished durability and instability due to point contact, despite being premised on contact.

The bias urging assembly in this mode can be disposed on the solenoid actuator, or disposed on the vibration damping device chassis to which the solenoid actuator has been assembled. Where disposed on the solenoid actuator, it is advantageous to employ, for example, an arrangement like that taught in a second mode of the invention, discussed later. The urging force of the bias urging assembly may be provided in the form of magnetic force or electromagnetic force as described later, or as elasticity of a rubber elastic body or the like. In this mode, the guide hole in the stator can be constituted by the inside peripheral face of the tubular bobbin of the coil, or by employing a guide sleeve attached to the yoke member of the stator and formed in cooperation with the stator, and using the inner peripheral face of this guide sleeve.

The second mode of the invention provides an active vibration damping device according to the aforementioned first mode, wherein the bias urging assembly comprises a magnetic biasing mechanism for biasing to one side in the axis-perpendicular direction a resultant force of magnetic forces excited in the axis-perpendicular direction between the movable element and the stator, by means of supplying electrical current to the coil.

In the active vibration damping device constructed according to this mode, magnetic force excited in the solenoid actuator can be utilized skillfully for making up the bias urging assembly. Thus, it is possible to advantageously realize the desired bias urging assembly, with fewer parts and simple construction.

Magnetic force biasing mechanism for biasing, to one side in the axis-perpendicular direction, the resultant force of the magnetic forces acting in the axis-perpendicular direction onto the movable element can be realized by means of various structures. For example, it is possible to achieve this by biasing the placement location of the movable element relative to the magnetic pole forming areas of the stator in the axis-perpendicular direction, so that the distance between the movable element and the magnetic poles produced in the stator is non-uniform about the circumference of the movable element. Alternatively, it may be realized by providing the movable element with a through-hole or notch, embedding nonmagnetic material in the interior of the movable element, or otherwise causing the lines of magnetic force passing through the interior of the movable element to differ in number in the circumferential direction. Various constructions in which such a through-hole, notch or nonmagnetic material is disposed on the stator side may also be employed as appropriate. More specifically, the following arrangements (A) and (B) are advantageous, for example.

(A) An arrangement whereby magnetic force biasing mechanism is realized by varying in the circumferential direction the distance between the magnetic pole forming areas where the magnetic poles are produced in the stator, and the magnetic action areas of the movable element subjected to magnetic action by the magnetic poles of the stator. (B) An arrangement whereby magnetic force biasing mechanism is realized by varying in the circumferential direction the number of lines of magnetic force passing through the interior of the stator and/or the movable element.

In the former arrangement (A), by designing non-uniform distance in the circumferential direction between the magnetic pole forming areas and the magnetic action areas of the movable element subjected to magnetic action, to provide areas in the circumferential direction of the movable element that are closer to the magnetic pole forming areas, and areas that are further away from the magnetic pole forming areas, magnetic force biasing mechanism can be realized through a simple structure. That is, utilizing the fact that magnetic action corresponds to distance to the magnetic poles, tilting of the movable element can be lessened by means of active attraction of regions close to the magnetic pole forming areas.

Here, possible modes by which the separating distance is made to vary include, for example, forming a notch in the movable element or the stator or both; or biasing the placement location of the movable element relative to the stator in the axis-perpendicular direction. According to modes such as these, magnetic force biasing mechanism can be achieved without the need to provide any separate special components.

The distance separating a magnetic pole forming area and a magnetic action area corresponds to the length of lines of magnetic force exiting a magnetic pole of the stator and entering the movable element, or of lines of magnetic force exiting the movable element and entering a magnetic pole of the stator. Depending on the specific shape and disposition of the stator and the movable element, this may represent distance between opposing portions in various directions, e.g. the axial direction, the axis-perpendicular direction, or the diagonal direction. In most cases, it is considered to be the distance between the closest points on a magnetic pole forming area on the stator and a magnetic action area on the movable element.

The latter arrangement (B) can be realized by limiting magnetic permeability over a portion of the magnetic path on the stator side, for example. Thus, magnetic force biasing mechanism can be achieved without the need for any special configuration of the movable element outside peripheral face or the guide hole inside peripheral face, by establishing a suitable shape of the yoke member positioned to the outside of the coil for example. Accordingly, the guiding action of the inside peripheral face of the guide can be utilized advantageously, to achieve an advanced guide mechanism at the same time.

A more specific construction for varying the number of lines of magnetic force in the circumferential direction can be realized, for example, by designing the level of saturation magnetic flux per unit of length in the circumferential direction, so as to vary on the circumference. Specifically, by providing either the stator, the movable element, or both with a space such as a through-hole, groove, or the like, the thickness dimension of the area permeated by the lines of magnetic force can be made non-uniform, thereby making the number of lines of magnetic force non-uniform in the circumferential direction; or by embedding non-magnetic material in the stator and the movable element, it is possible to create areas permeable to lines of magnetic force, which areas are non-uniform in the circumferential direction. Where the use of such a construction changes the weight balance of the movable element, a filler may be embedded in the space to preserve the balance.

A third mode of the invention provides an active vibration damping device according to the aforementioned first or second mode, wherein a sliding contact surface for sliding contact by the movable element when the movable element undergoes actuated displacement in the axial direction is disposed on an inside face of the guide hole, in a portion extending a predetermined length in the axial direction.

In the active vibration damping device constructed according to this mode, by actively disposing a linear contact face extending in the axial direction as a sliding contact face, the movable element is placed in sliding displacement against the inside peripheral face of the guide hole in the stator in a linear configuration extending in the axial direction, at least when the oscillation member is in an excitation actuated state. Thus, repeated contact and separation of the movable element and the stator can be avoided, providing a higher level of stabilization of axial displacement of the movable element. It is also possible to avoid a transitory increase in striking force due to the movable element and the stator striking one another.

The movable element may be designed to contact the inside peripheral face of the guide hole in the stator in a linear configuration only when actuated, or to contact it in a linear configuration from the start, even when not actuated.

A fourth mode of the invention provides an active vibration damping device according to any one of the aforementioned first through third modes, wherein axis-perpendicular direction displacement permitting assembly for permitting relative displacement of the movable element and the oscillation member in the axis-perpendicular direction is disposed between the movable element in the solenoid actuator, and the oscillation member to which the movable element is attached.

In the active vibration damping device constructed according to this mode, axis-perpendicular direction displacement of the movable element is permitted without being subject to constraint by the axis-perpendicular direction position of the oscillation member, or with a reduced level of constraint by the axis-perpendicular direction position of the oscillation member. Thus, negative effects due to positioning accuracy of the oscillation member may be avoided, while being able to achieve bias of the movable element and the stator towards the axis-perpendicular direction in the actuator, whereby a linear contact configuration such as that described previous may be advantageously realized.

A fifth mode of the invention provides an active vibration damping device according to the aforementioned fourth mode, wherein the axis-perpendicular direction displacement permitting assembly is constituted by furnishing a connecting rod that projects from the oscillation member to the movable element; forming a mating hole for inserting a projecting distal end portion of the connecting rod in the movable element, and having an inside peripheral face slightly larger than an outside peripheral face of the connecting rod, the connecting rod inserted through the mating hole being positioned in the axial direction to the movable element so as to permit displacement of the connecting rod in the axis-perpendicular direction within the mating hole.

According to this mode, the axis-perpendicular direction displacement permitting assembly of the fourth mode can be realized advantageously. In this mode, attachment of the connecting rod to the movable element positioned in the axial direction while permitting displacement thereof in the axis-perpendicular direction may be advantageously achieved, for example, by sandwiching the movable element in the axial direction by a pair of abutting members with excellent slidability, fitted externally onto the connecting rod, and elastically positioning the abutting members with respect to the connecting rod by means of a biasing rubber part or the like, while utilizing the urging force of the biasing rubber part to press the pair of abutting members against the movable element. In this sort of arrangement, displacement of the connecting rod relative to the movable element in the axis-perpendicular direction is permitted by means of sliding between the abutting faces of the pair of abutting members and the movable member sandwiched therebetween.

As will be apparent from the preceding description, in vibration damping devices constructed according to the present invention, tilting of the movable element is controlled so as to avoid point contact of the movable element against the stator, thereby preventing the movable element from coming into contact with high localized contact pressure against, or abrading against and scratching, the inside face of the guide hole. Thus, for an extended period the movable element undergoes stable actuated displacement guided in the axial direction by the guide hole, which actuated displacement of the movable element is exerted on the oscillation member, whereby the desired active vibration damping capability is exhibited consistently for an extended period.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
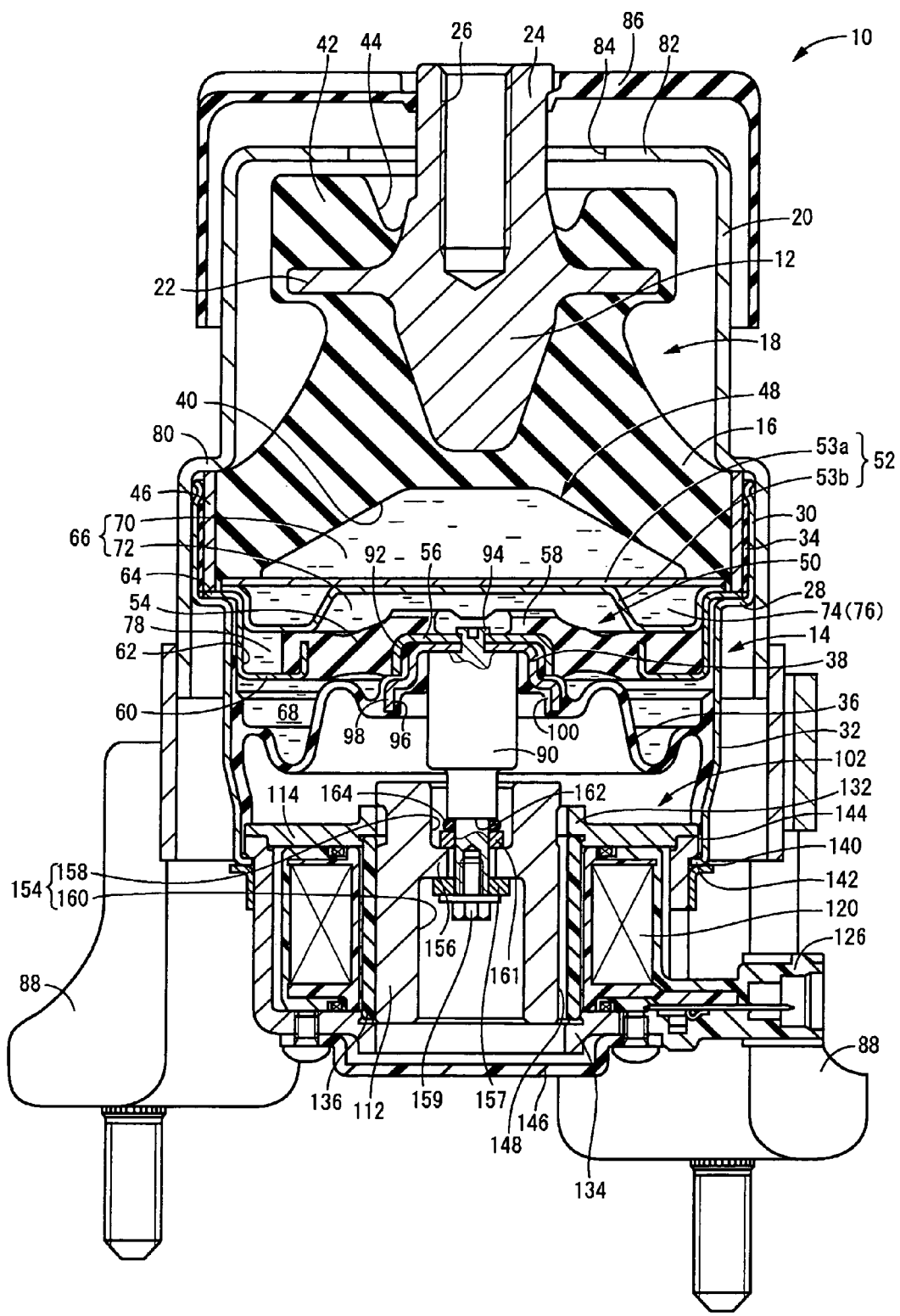
FIG. 1 is an elevational view in axial or vertical cross section of an active vibration damping device in the form of an engine mount of construction according to a first embodiment of the present invention.

Referring first to FIG. 1, there is shown an active vibration damping device in the form of an automotive engine mount 10 of construction according to a first embodiment of the present invention. The arrangement of this engine mount 10 has a mount body 18 composed of a metallic first mounting member 12, and a metallic second mounting member 14, positioned in opposition and spaced apart from one another, and elastically linked by means of a main rubber elastic body 16 interposed between them; and installed fitting within a stopper fitting 20 of metal. With the first mounting member 12 attached to a power unit (not shown) and the second mounting member 14 attached to an automobile body (not shown), the power unit is supported on the body in a vibration-damped manner. In this installed state, the distributed load of the power unit is exerted on the engine mount 10, across the first mounting member 12 and the second mounting member 14 in the mounting center axis direction, which is the vertical direction in FIG. 1, whereby the main rubber elastic body 16 undergoes elastic deformation in the direction bringing the first mounting member 12 and the second mounting member 14 closer together. The principle vibrations to be damped are also input across the first mounting member 12 and the second mounting member 14, in the directions urging the two mounting members 12, 14 closer together/apart. In the description hereinbelow, unless indicated otherwise, vertical direction refers to the vertical direction in FIG. 1.

To describe in greater detail, the first mounting member 12 has an inverted frustoconical shape. At the large-diameter end of the first mounting member 12 there is integrally formed an annular disk shaped stopper portion 22 that projects out on the outer peripheral face. Additionally, an integral fastening shaft 24 projects axially upward from the large-diameter end, and a fastening screw hole 26 that opens onto the upper end face is formed in the fastening shaft 24. By means of a fastening bolt (not shown) screwed into this fastening screw hole 26, the first mounting member 12 is attached to the automobile's power unit, not shown.

The second mounting member 14 has a large-diameter, generally cylindrical shape. A shoulder portion 28 is formed in the axially medial portion of the second mounting member 14; to either side of this shoulder portion 28, the side axially above constitutes a large-diameter section 30, while the side axially constitutes a small-diameter section 32. The inside peripheral face of the large-diameter section 30 is covered by an adhering thin seal rubber layer 34. A diaphragm 36 consisting of a thin rubber film is disposed as a flexible film, in proximity to the lower open end of the small-diameter section 32; by means of vulcanization bonding the outer peripheral edge portion of the diaphragm 36 to the inside peripheral face of the small-diameter section 32 of the second mounting member 14, the lower open end of the second mounting member 14 is provided with fluidtight closure. A connecting fitting 38 is vulcanization bonded to the center portion of the diaphragm 36.

The first mounting member 12 is positioned axially above and spaced apart from the second mounting member 14, with the first mounting member 12 and the second mounting member 14 being linked elastically by means of the main rubber elastic body 16.

The main rubber elastic body 16 has a generally frusto-conical shape overall, with a conical recess face 40 formed on the large-diameter end face. The first mounting member 12 is inserted into the small-diameter end of the main rubber elastic body 16, and vulcanization bonded therewith. The stopper portion 22 of the first mounting member 12 is superposed against the small-diameter face of the main rubber elastic body 16 and vulcanization bonded thereto so as to be sheathed by the main rubber elastic body 16, and an abutting rubber 42 integrally formed with the main rubber elastic body 16 projects upwardly from the stopper portion 22, with a groove 44 formed on the inner side of the abutting rubber 42. A connecting sleeve 46 is vulcanization bonded to the outside peripheral face at the large-diameter end of the main rubber elastic body 16.

The connecting sleeve 46 vulcanization bonded to the outside peripheral face at the large-diameter end of the main rubber elastic body 16 is fitted within the large-diameter section 30 of the second mounting member 14, and the large-diameter section 30 is then subjected to a diameter reduction process thereby securing the main rubber elastic body 16 mated fluidtightly with the second mounting member 14. By so doing, the axial upper opening of the second mounting member 14 is provided with fluidtight closure by the main rubber elastic body 16, thereby forming between the opposing faces of the main rubber elastic body 16 and the diaphragm 36 in the second mounting member 14 interior a fluid chamber 48 that constitutes a sealed zone fluidtightly isolated from the outside, with a non-compressible fluid being sealed within this fluid chamber 48.

As the non-compressible fluid sealed therein, there may be employed water, an alkylene glycol, a polyalkylene glycol, silicone oil, or the like; in preferred practice, in order to effectively achieve vibration damping action on the basis of fluid resonance action, a low-viscosity fluid of 0.1 Pa·s or less will be employed.

A partition member 50 and an orifice member 52 are also assembled with the second mounting member 14, disposed between the opposing faces of the main rubber elastic body 16 and the diaphragm 36.

The partition member 50 has a support rubber elastic body 54 extending out with predetermined thickness, and an oscillation plate 56 constituting the oscillation member is vulcanization bonded to the center portion of this support rubber elastic body 54. The oscillation plate 56 is of shallow inverted cup shape, and is vulcanization bonded at its outside peripheral edge to the inside peripheral edge of the support rubber elastic body 54. A thick cushioning portion 58 is formed by extending the support rubber elastic body 54 around to the upper side of the oscillation plate 56.

An outer peripheral fitting 60 is vulcanization bonded to the outside peripheral edge of the support rubber elastic body 54, and a circumferential groove extending a predetermined distance in the circumferential direction is formed in the outer peripheral fitting 60. The upper axial opening of this outer peripheral fitting 60 is constituted as a flange portion 64 that flares diametrically outward; the flange portion 64 is juxtaposed against the shoulder portion 28 of the second mounting member 14, and secured clamped between the shoulder portion 28 and the connecting sleeve 46. With this arrangement, the partition member 50 is positioned extending in the axis-perpendicular direction in the medial portion between the opposing faces of the main rubber elastic body 16 and the diaphragm 36, bifurcating the interior of the second mounting member 14 to either side in the axial direction. Thus, to either side of the partition member 50, an working fluid chamber 66 a part of whose wall is constituted by the main rubber elastic body 16 and that undergoes pressure fluctuations based on elastic deformation of the main rubber elastic body 16 during vibration input is formed to the upper side thereof. To the lower side of the partition member 50, meanwhile, there is formed an equilibrium chamber 68 a part of whose wall is constituted by the diaphragm 36, and that readily permits change in volume.

The orifice member 52 is composed of upper and lower thin plates 53a, 53b superimposed on one another, and its outer peripheral edge is juxtaposed against the flange portion 64 of the outer peripheral fitting 60, and clamped between the flange portion 64 and the inside peripheral edge of the large-diameter end portion of the main rubber elastic body 16, and fixedly supported thereby by the second mounting member 14 via the main rubber elastic body 16. With this arrangement, the orifice member 52 is positioned extending in the axis-perpendicular direction in the medial portion between the opposing faces of the main rubber elastic body 16 and the partition member 50, bifurcating the interior of the working fluid chamber 66 to either side in the axial direction.

At the outer peripheral edge portion of the orifice member 52, there is formed a circumferential passage 74 extending continuously in the circumferential direction between the juxtaposed faces of the upper and lower thin plates 53a, 53b. A first end of this circumferential passage 74 connects to a pressure receiving chamber 70, and the other end connects to an excitation chamber 72. With this arrangement, there is formed a first orifice passage 76 by which the pressure receiving chamber 70 and the excitation chamber 72 communicate with one another. The first orifice passage 76 is tuned, for example, to a middle frequency range of about 30-40 Hz corresponding to engine vibration or the like.

The outside edge portion of the orifice member 52 is superposed on the outside peripheral edge portion of the partition member 50, and a second orifice passage 78 is formed by covering a circumferential groove 62 formed in the outside peripheral edge of the outer peripheral fitting 60. This second orifice passage 78 connects at one end thereof to the pressure receiving chamber 70 via the excitation chamber 72 and the first orifice passage 76, while the other end connects to the equilibrium chamber 68. With this arrangement, there is formed a second orifice passage 78 through which the pressure receiving chamber 70 and the equilibrium chamber 68 communicate with one another. This second orifice passage 78 is tuned to a middle frequency range of about 10 Hz corresponding to engine shake or the like.

The specific forms and tuning of the orifice passages are not limited in any particular way; besides the embodiments discussed above, it would also be possible, for example, to bore through the center portion of the orifice member 52 to form a first orifice passage of through-hole form through which the pressure receiving chamber 70 and the excitation chamber 72 can communicate directly, and tuning this first orifice passage to a high frequency range of about 50-150 Hz corresponding to rumble noise or the like, while forming the second orifice passage by means of directly connecting in series the circumferential passage 74 of the orifice member 52 and the circumferential groove 62 of the outer peripheral fitting 60.

Additionally, the mount body 18 constructed in the above manner is attached to the body of the automobile, not shown, via the stopper fitting 20, with the second mounting member 14 fitted into the stopper fitting 20.

The stopper fitting 20 has the form of a large-diameter shouldered cylinder, the lower side of which is larger in diameter than the upper side; the mount body 18 is inserted therein from the lower opening, and secured press-fit therein detained by a detent shoulder portion 80. At the opening on the upper side, there is formed an abutting portion 82 that extends inwardly, and a stopper function in the rebound direction is achieved by means of the stopper portion 22 of the first mounting member 12 coming into abutment with the abutting portion 82 via the abutting rubber 42. The abutting portion 82 is perforated by an insertion hole 84, maintaining a suitable gap with respect to the fastening shaft 24 of the first mounting member 12, so as to permit relative displacement of the first mounting member 12 in the axis-perpendicular direction. An umbrella-like shield member 86 is attached to the fastening shaft 24 of the first mounting member 12, so as to extend out and cover the insertion hole 84 of the stopper fitting 20.

The second mounting member 14 that has been fitted into the stopper fitting 20 is now secured press-fit therein detained by a detent shoulder portion 80, thereby securing it so as to be unable to slip out. Several leg portions 88 that project from the outer peripheral face and extend downward are affixed to the stopper fitting 20, these leg portions 88 being positioned on the body of the automobile (not shown) and fastened with fastening bolts to attach the engine mount 10 to the of the automobile.

In the mount body 18, the oscillation plate 56 disposed on the partition member 50 is secured superposed in intimate contact with the connecting fitting 38 disposed on the diaphragm 36. An actuating rod 90 that functions as a connecting rod and an inner rod is affixed to the oscillation plate 56 and the connecting fitting 38, with the actuating rod 90 projecting axially downward from the oscillation plate 56 and the connecting fitting 38.

A clamped rubber layer 92 integrally formed with the diaphragm 36 covers substantially the entire circumference of the connecting fitting 38, thereby providing a fluidtight seal at the mating face thereof with the oscillation plate 56. The oscillation plate 56 and the connecting fitting 38 are superposed top to bottom at their centers, with a caulked portion 94 integrally formed on the upper end of the actuating rod 90 passed through these center portions. By means of the caulked portion 94, the oscillation plate 56 and the connecting fitting 38 are caulked in intimate contact, with the actuating rod 90 projecting axially downward from the oscillation plate 56 and towards the outside through the connecting fitting 38, unifying the oscillation plate 56 and the connecting fitting 38, and forming a recess 96 that opens towards an armature 112, described later. In proximity to the peripheral wall 98 of the recess 96 a cushion rubber portion 100 having a shape that covers the peripheral wall 98 is integrally formed with the diaphragm 36.

An electromagnetic oscillator 102 serving as the solenoid actuator is situated axially below the second mounting member 14 with the projecting actuating rod 90, i.e. on the opposite side of the oscillation plate 56 and the connecting fitting 38 from the working fluid chamber 66, supported by the second mounting member 14.

Figure 2:
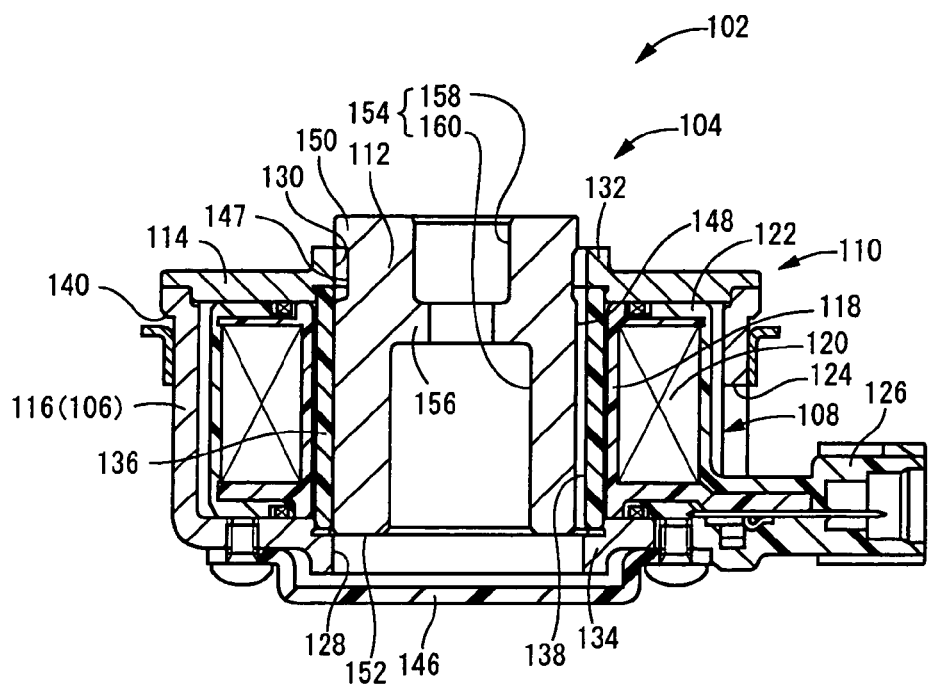
FIG. 2 is an axial cross sectional view of a solenoid actuator of the engine mount of FIG. 1.
Figure 3:
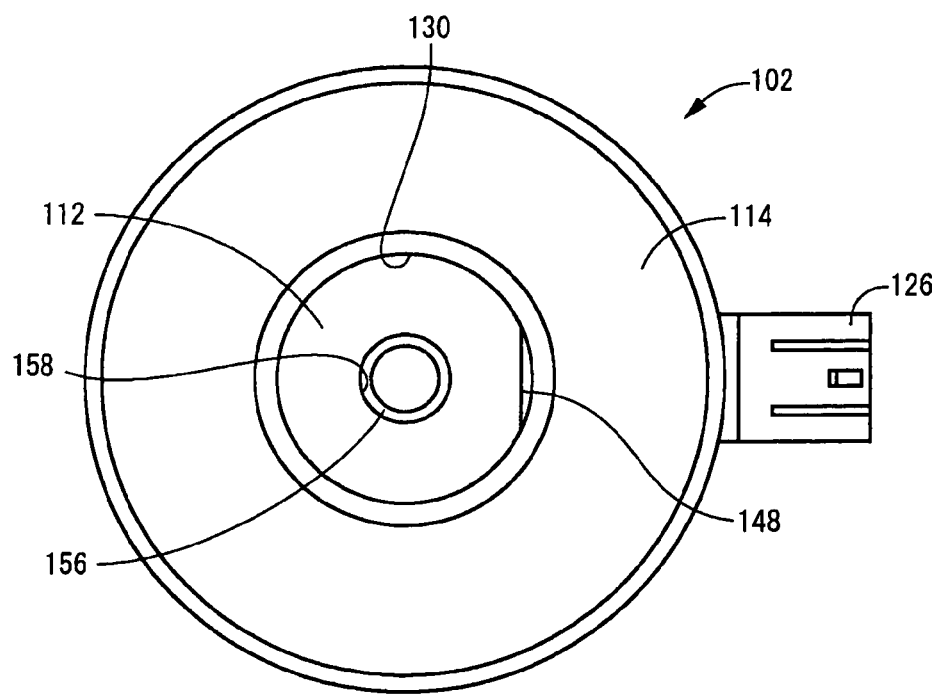
FIG. 3 is a top plane view of the solenoid actuator of FIG. 2.

FIG. 2 shows the electromagnetic oscillator 102 in cross section, and FIG. 3 shows in plan view. The electromagnetic oscillator 102 is composed of a solenoid 104, and a housing 106 supporting the solenoid 104 housed therein. More specifically, the solenoid 104 is composed of a stator in the form of a magnetic pole forming member 110 comprising a coil member 108, and the armature 112 serving as the movable element, positioned so as to be capable of relative displacement in the axial direction with respect to the coil member 108. In this embodiment in particular, the housing is not a separate independent member. Instead, the lower yoke 116 that constitutes part of the magnetic pole forming member 110 serves as the housing 106.

The magnetic pole forming member 110 is composed of the coil member 108, and an upper yoke 114 and the lower yoke 116 which are attached about the perimeter of the coil member 108. Additionally, the coil member 108 has a coil 120 wrapped around a bobbin 118, with a cover member 122 of nonmagnetic material disposed covering the outside periphery of the coil 120. The cover member 122 is produced, for example, by resin molding after the coil 120 has been wound onto the bobbin 118. This cover member 122 has integrally formed therein a power supply opening 126 which projects to the outside from an opening 124 made through the lower yoke 116, and power is supplied to the coil 120 via a terminal disposed within the power supply opening 126. The driving voltage having frequency components supplied to the coil 120 is not limited to alternating current, with pulsating current being acceptable as well, and control is not limited to analog, but may be digital instead.

The lower yoke 116 which serves as the housing 106 has a lower through-hole 128 made in the center portion thereof, and is formed with an "L" shaped cross section extending substantially all the way around the circumference so as to enclose the outside peripheral face and the lower end face of the coil member 108. The upper yoke 114 is disposed on the upper end face of the coil member 108. The upper yoke 114 is formed with a general disk shape having an upper through-hole 130 of diameter dimension approximately equal to the lower through-hole 128 of the lower yoke 116, with the edge on the inner peripheral side being made somewhat thicker, while the edge on the outer peripheral side is positioned covering the coil member 108, in a state of contact with the upper end of the lower yoke 116. The upper yoke 114 and the lower yoke 116 are constituted as yoke members formed of ferromagnetic material, constituting a stationary side magnetic path through which flows magnetic flux produced by supply of current to the coil 120, while the inside peripheral edge portions of the upper through-hole 130 and the lower through-hole 128 respectively constitute an upper magnetic pole 132 and a lower magnetic pole 134 serving as magnetic pole forming areas where the magnetic poles form when current is supplied to the coil 120.

Within the center hole of the coil 120 constituting the stator, there is installed a guide sleeve 136 arranged so as to cover the openings at the upper and lower inside peripheral edge portions formed by the upper yoke 114 and the lower yoke 116. In this embodiment, the stator is composed to include this guide sleeve 136, and the center hole of the guide sleeve 136 constitutes a tubular guide face 138 serving as a guide hole. That is, the tubular guide face 138 of the guide sleeve 136 is constituted as a tube shaped face slightly smaller in diameter than the magnetic pole inside faces of the upper yoke 114 and the lower yoke 116, and is positioned slightly inward in the diametrical direction from the magnetic pole inside faces of the upper and lower yokes 114, 116. This tubular guide face 138 will preferably be formed of low-friction material such as polyethylene or polytetrafluoroethylene. The guide sleeve 136 may be fixed with respect to the upper and lower yokes 114, 116, elastically supported, or installed with somewhat of a gap (chatter). That is, it suffices for the guide sleeve 136 to smoothly guide the armature 112 in the axial direction, while preventing it from interfering with the upper and lower yokes 114, 116, etc.

On the outside peripheral edge of the housing 106, there is incised an mating groove 140; a detent piece 142 formed on the lower end of the second mounting member 14 fits into this mating groove 140 and is detained therein, whereby the magnetic pole forming member 110 of the electromagnetic oscillator 102 is attached so as cover the lower end opening of the second mounting member 14. In this way, in this embodiment, the electromagnetic oscillator 102 is fastened directly to the second mounting member 14 without interposing any bracket or other separate element, thus reducing positioning deviation of the center axes of the oscillation plate 56 and the coil 120 during assembly. Since a clamped rubber element 144 formed by extending the diaphragm 36 downward is clamped between the housing 106 of the electromagnetic oscillator 102 and the second mounting member 14, chatter of the electromagnetic oscillator 102 is prevented. With this arrangement, the center axis of the coil 120 is substantially aligned with the center axis of the mount body 18, and coincident with the center axes of the second mounting member 14 and the oscillation plate 56. A cover member 146 is bolted to the bottom of the housing 106, to prevent dust and the like from infiltrating into the lower through-hole 128 of the housing 106.

The armature 112 is assembled within the lower through-hole 128 of the housing 106 in which the coil 120 has been installed. The armature 112 is formed of a ferromagnetic body of generally cylindrical block shape overall; its outside diameter dimension is slightly smaller than the inside diameter dimension of the guide sleeve 136, and it is assembled fitting within the guide sleeve 136 so as to be capable of relative displacement in the axial direction, on approximately the same center axis. Additionally, the armature 112 has an axial length dimension that spans the upper and lower magnetic poles 132, 134, and in proximity to the upper magnetic pole 132 thereof there is formed a circumferential groove 147 that opens onto the outside peripheral face. The axial upper end portion 150 and lower end face 152 of the armature 112 constitute magnetic action areas; as illustrated, for example, magnetic gaps at which effective magnetic attracting force is excited are formed in a position-adjusted manner, between the upper end portion 150 and the upper magnetic pole 132 of the upper yoke 114, and between the lower end face 152 of the armature 112 and the lower magnetic pole 134 of the lower yoke 116. The outside peripheral face of the armature 112 is subjected to a low friction treatment or anticorrosion treatment with any of various coating materials known in the art.

Figure 4:
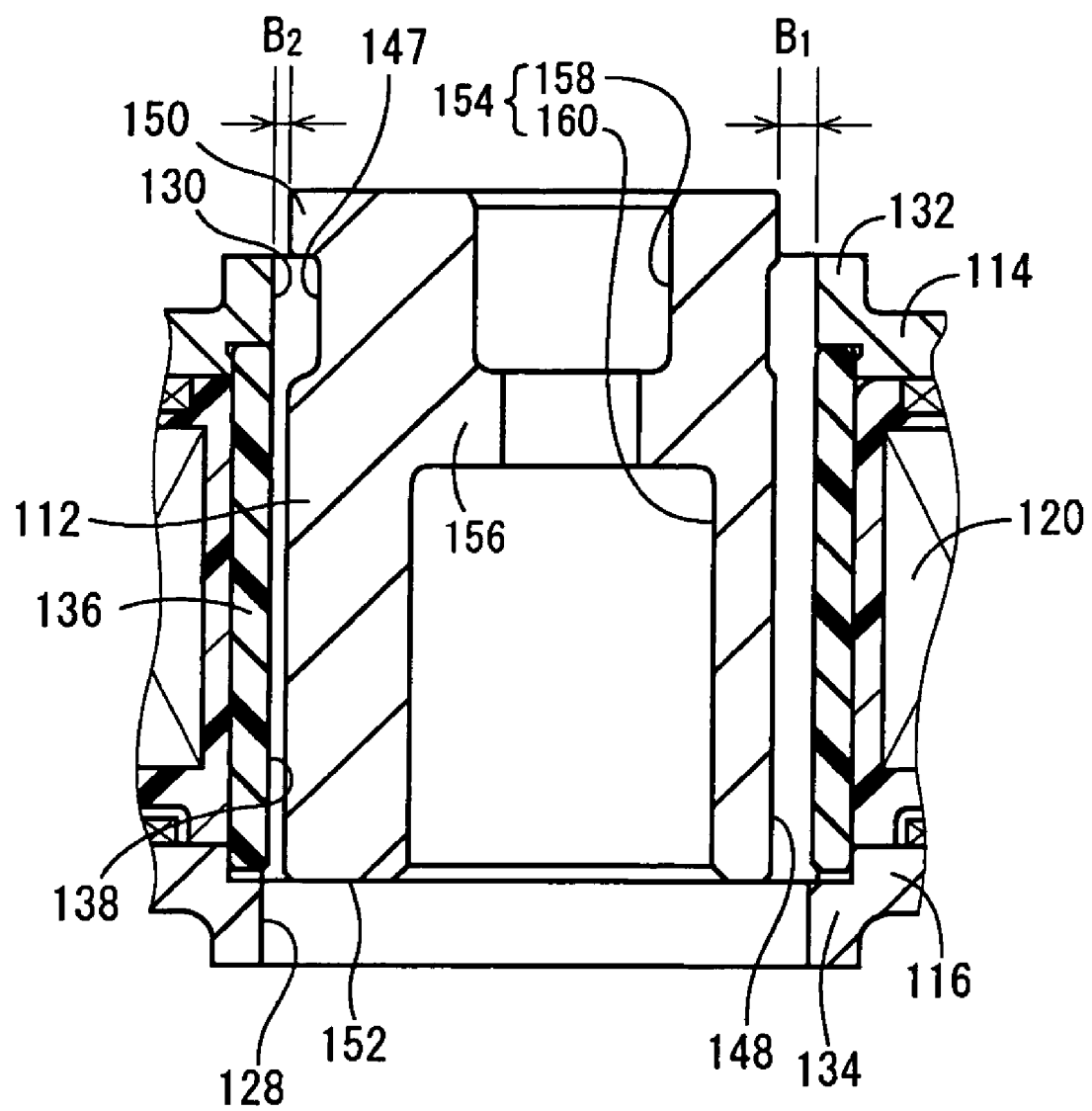
FIG. 4 is a fragmentary enlarged view of the solenoid actuator of FIG. 2.

Here, a flat surface 148 constituting bias urging assembly (magnetic biasing mechanism), a circumferential portion of which is cut away along the entire length in the axial direction, is formed on the armature 112. As shown in FIG. 4, by forming a flat surface 148, the axis-perpendicular distance "B1" between opposing faces of the inner peripheral faces of the upper and lower yokes 114, 116 and the flat surface 148 is made to differ from the axis-perpendicular distance "B2" between opposing faces of the inner peripheral faces of the upper and lower yokes 114, 116 and the outer peripheral face other than the flat surface 148, with B1 being relatively greater than B2. With this arrangement, the axis-perpendicular distance between opposing faces of the upper magnetic pole 132 and the upper end portion 150 of the armature 112, and the axis-perpendicular distance between opposing faces of the lower magnetic pole 134 and the lower end face 152 of the armature 112, at which magnetic force is excited by means of current flowing through the coil 120, will each differ between the distance B1 on the flat surface 148 and the distance B2 in other areas, whereby the distance separating the upper and lower magnetic poles 132, 134 of the upper end portion 150 and the lower end face 152, which serve as magnetic action areas, is non-uniform in the circumferential direction of the armature 112.

A through-hole 154 is formed as a mating hole, bored through the center axis in the armature 112. An inward protruding portion 156 is formed in the axially medial portion of this through-hole 154, and to either side of the inward protruding portion 156, the through-hole 154 consists of a small-diameter portion 158 on the side axially above and a large-diameter portion 160 on the side axially below.

The actuating rod 90 is passed through the through-hole 154 of the armature 112 with a gap to allow some play, and with the lower end thereof projecting downward beyond the inward protruding portion 156 of the armature 112. To this projecting lower end of the actuating rod 90 is externally fitted an annular support member 157 having an outside diameter dimension slightly larger than the inside diameter dimension of the inward protruding portion 156, and supported non-detachably on the actuating rod 90 by means of a bolt 159 screwed into the distal end of the actuating rod 90. This support member 157 is detained against the lower face of the inward protruding portion 156 of the armature 112, whereby the armature 112 is detained non-detachably from the support member 157 in the axial direction.

On the actuating rod 90 on the opposite side of the inward protruding portion 156 from the support member 157, there is externally fitted an annular holding portion 161 having an outside diameter dimension larger than the inside diameter dimension of the inward protruding portion 156, with the holding portion 161 superposed against the upper face of the inward protruding portion 156. Additionally, the holding portion 161 is subjected to urging force downward in the axial direction by means of a rubber ring 164 externally fitted onto the actuating rod 90 and clamped between a stepped face 162 formed in the axial medial portion of the actuating rod 90, and the upper face of the holding portion 161. The tightening force of the bolt 159 acts on this rubber ring 164 between the stepped face 162 and the holding portion 161. Thus, the rubber ring 164 exhibits spring rigidity such that it undergoes substantially no deformation in response to actuating force in the axial direction on the order of that exerted on the actuating rod 90 by the armature 112.

In this way, the holding portion 161 and the support member 157 are juxtaposed against the inward protruding portion 156 of the armature 112 from above and below, and are held in abutment due to the elasticity of the rubber ring 164, so that the armature 112 is positioned substantially fixedly in the axial direction. By means of the rubber ring 164, the actuating rod 90 and the armature 112 are linked while positioned relative to one another in the axial direction; and actuating force excited in the armature 112 by current flowing through the coil 120 is exerted on the actuating rod 90 in the axial direction. By means of linking the armature 112 and the oscillation plate 56 via the actuating rod 90, the oscillation plate 56 functions as the oscillation member of the electromagnetic oscillator 102 serving as the solenoid actuator.

The support member 157, the holding portion 161 and the actuating rod 90 are disposed such that a certain gap is formed between the axis-perpendicular opposing faces of the outside peripheral faces of these elements on the one hand, and the inside peripheral face of the armature 112 on the other. By means of adjusting the abutting force of the support member 157 and the holding portion 161 against the inward protruding portion 156 produced by the elasticity of the rubber ring 164, in the event that the armature 112 is subjected to external force in the axis-perpendicular direction, exceeding the static frictional force produced among the support member 157, the holding portion 161 and the inward protruding portion 156, relative slipping displacement of the armature 112 with respect to the actuating rod 90 in the axis-perpendicular direction will be permitted, whereby the inward protruding portion 156, the support member 157, the holding portion 161 and the rubber ring 164 constitute a relative displacement-permitting linking means linking the armature 112 and the actuating rod 90 so as to enable relative displacement thereof in the axis-perpendicular direction, as well as constituting an axis-perpendicular displacement-permitting assembly that permits relative displacement of the armature 112 with respect to the coil member 108. By means of this arrangement, it is possible to advantageously adjust for relative positional deviation of the actuating rod 90 and the armature 112 caused by dimensional error in manufacture of the components or positioning error during assembly, so that the armature 112 can be positioned stably in the axis-perpendicular direction with respect to the coil 120, as well as adjusting for temporary axial deviation during actuator operation, so as to achieve stable operating characteristics.

The level of relative displacement of the armature 112 with respect to the actuating rod 90 in the axis-perpendicular direction is determined by the distance between the opposing faces of the support member 157, the holding portion 161 and the outside peripheral end of the actuating rod 90 on the one hand, and the inside peripheral face of the armature 112 on the other; a range of 0.2-3 mm is favorably employed for this permitted level of displacement. In order to achieve better slipping displacement of the armature 112, it would be acceptable, for example, to attach sliding portions of low-friction material such as polyethylene or polytetrafluoroethylene to these sliding faces, or to subject them to low-friction treatment.

While not shown in the drawing, in the engine mount 10 having the construction described above, it is possible to control current flow to the coil 120. This control of current flow can be accomplished, for example, by means of adaptive control or other feedback control, using the engine ignition signal of the power unit as a reference signal and the vibration detection signal of the component being damped as an error signal; or on the basis of control data established in advance. With this arrangement, by producing magnetic force acting on the armature 112 to actuate it downward in the axial direction, and then halting current flow to the coil 120 and allowing the recovery force of the support rubber elastic body 54 to act, it becomes possible to subject the oscillation plate 56 to actuating force which corresponds to the vibration being damped, and thus achieve active vibration damping action by internal pressure control of the working fluid chamber 66.

In the engine mount 10 of this embodiment, by forming a notched flat surface 148 on the electromagnetic oscillator 102 which constitutes the solenoid actuator, it is possible to reduce tilt of the armature 112 during excited actuation in the axial direction through supply of current to the coil 120. Specifically, since the distance between the flat surface 148 and the upper and lower magnetic poles 132, 134 in the circumferential direction of the armature 112 is greater as compared to other areas in the circumferential direction, the magnetic force acting on the area where the flat surface 148 is formed will be lower than the magnetic force acting on other areas, whereby the resultant force of the axis-perpendicular-directed magnetic force component of magnetic force acting on the armature 112 is produced in one direction on the opposite side from the flat surface 148 in the axis-perpendicular direction (the right side in FIG. 1).

By means of this arrangement, the magnetic force acting in one direction is exerted on the upper and lower ends of the armature 112, so that tilting of the armature 112 can be reduced. By means of reducing tilting of the armature 112, point contact of the armature 112 with the upper or lower yoke 114, 116 or with the guide sleeve 136 can be reduced or avoided, thereby improving operational stability, as well as protecting any coating layer on the armature 112 so that the low-friction sliding characteristics or corrosion resistance afforded by the coating layer will be exhibited consistently for an extended period.

In this embodiment, relative displacement of the actuating rod 90 and the armature 112 is possible by means of the support member 157 which constitutes an axis-perpendicular direction displacement permitting assembly. Therefore, when magnetic force acting in one direction is exerted on the armature 112 through supply of current to the coil 120 causing the armature 112 to become displaced in the axis-perpendicular direction, the armature 112 is able to undergo displacement by itself, thus avoiding effects on the actuating rod 90. Additionally, by means of this axis-perpendicular direction displacement permitting assembly, the armature 112 is able to move in the axis-perpendicular direction by itself when magnetic force acting in one direction is exerted on the armature 112, whereby it is possible to quickly reduce tilting of the armature 112.

In this electromagnetic oscillator 102, by means of adjusting the notch depth of the flat surface 148 on the armature 112 as well as the relative positions of the armature 112 and the upper and lower magnetic poles 132, 134, it is possible to produce on the armature 112 more active magnetic attracting force directed to one side in the axis-perpendicular direction, so that the outside peripheral face of the armature 112 assumes a state of linear contact with the tubular guide face 138 of the guide sleeve 136. By making this tubular guide face 138 a sliding face, and producing a state of linear contact with the tubular guide face 138, it becomes possible to actively utilize the guiding action provided by the tubular guide face 138 to achieve more stable excited actuation in the axial direction.

While the present invention has been described in detail in its presently preferred embodiment, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

Figure 5:
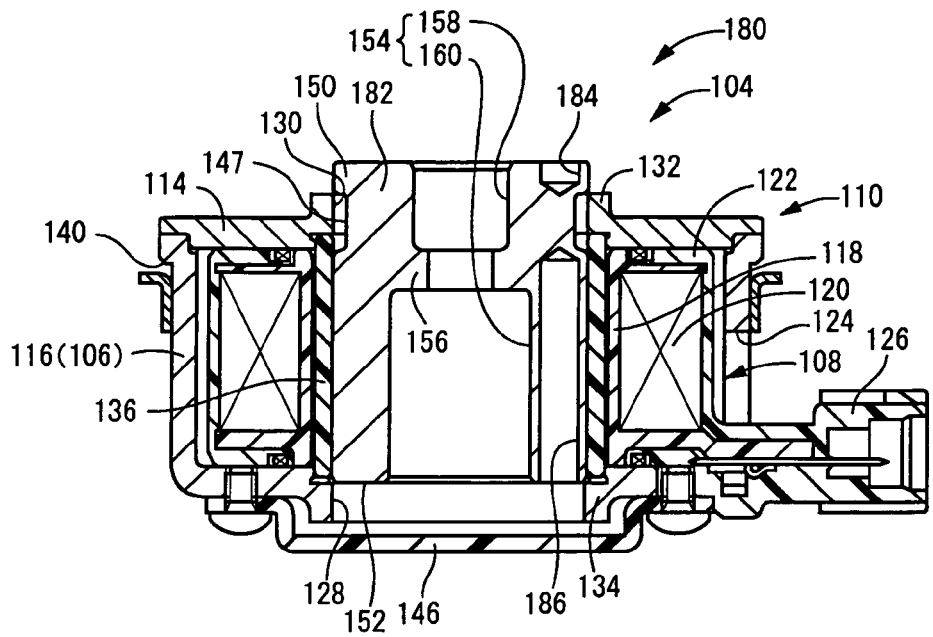
FIG. 5 is an axial cross sectional view of a solenoid actuator used in an active vibration damping device of construction according to a second embodiment of the present invention.
Figure 6:
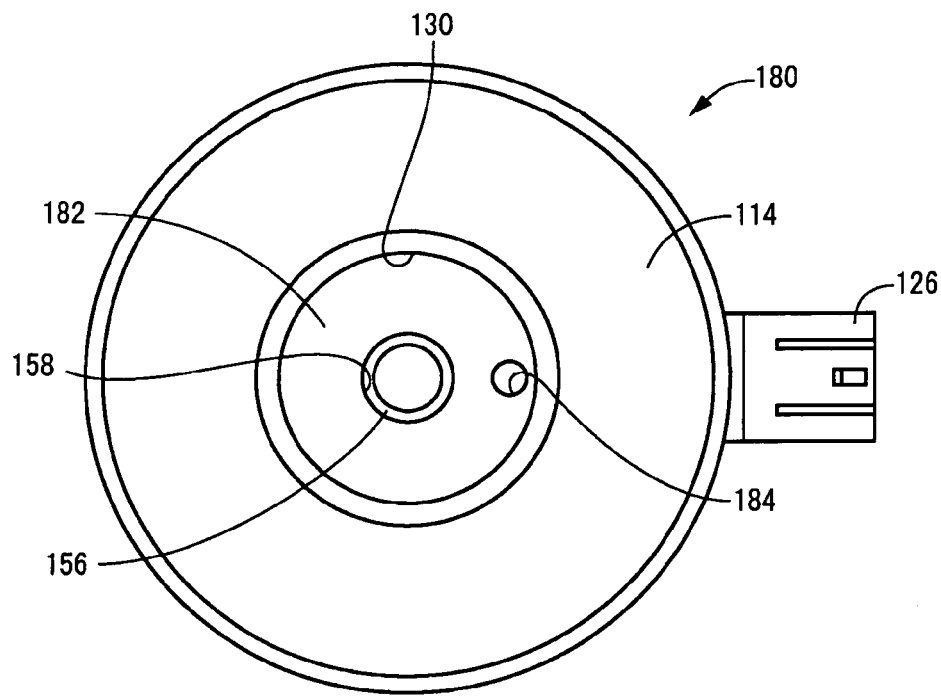
FIG. 6 is a top plane view of the solenoid actuator of FIG. 5.

Referring next to FIG. 5 and FIG. 6, an electromagnetic oscillator 180 serving as the solenoid actuator is shown as a component of an active vibration damping device of construction according to a second embodiment of the invention. The electromagnetic oscillator 180 has an upper groove 184 and a lower groove 186 as magnetism biasing mechanis, formed over part of the circumference of the armature 182. Specifically, in this electromagnetic oscillator 180, by means of forming upper and lower grooves 184, 186 in the armature 182, the zones permitting passage of lines of magnetic force differ along the circumference of the armature 182. It is possible thereby to vary in the circumferential direction the number of lines of magnetic force flowing through the armature 182, to generate in one direction in the circumferential direction, a resultant force of the magnetic force components acting in the axis-perpendicular direction. The specific shapes of the upper and lower grooves 184, 186 are not limited in any way, not merely to groove shape as shown in this embodiment, it being possible instead to form a through-hole, or to form multiple grooves or through-holes of this kind. Where formation of such grooves or through-holes changes the weight balance of the armature 182, balance may be preserved with a filler or the like.

Figure 7:
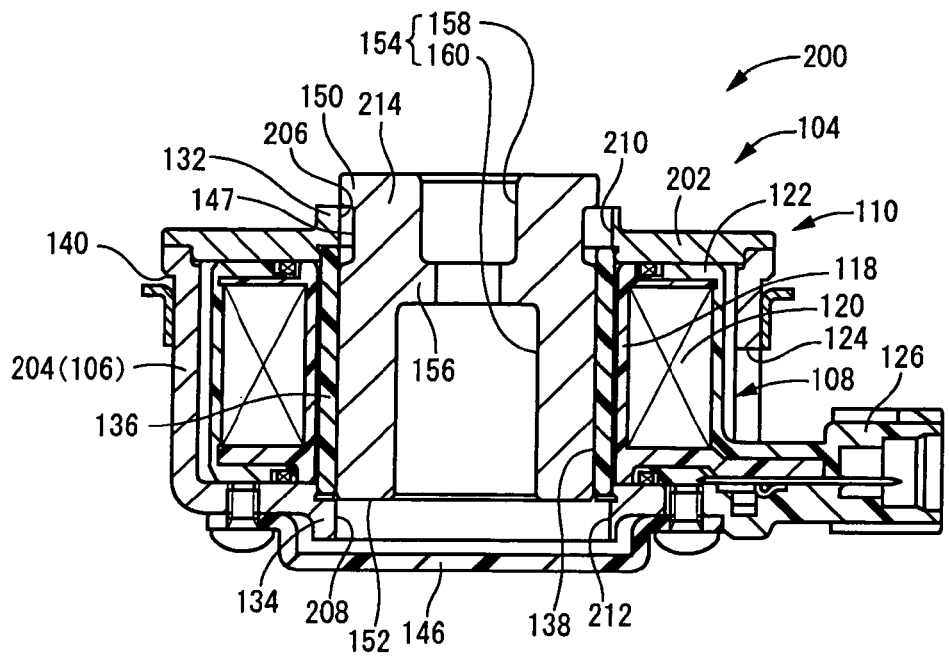
FIG. 7 is an axial cross sectional view of a solenoid actuator used in an engine mount of construction according to a third embodiment of the present invention.
Figure 8:
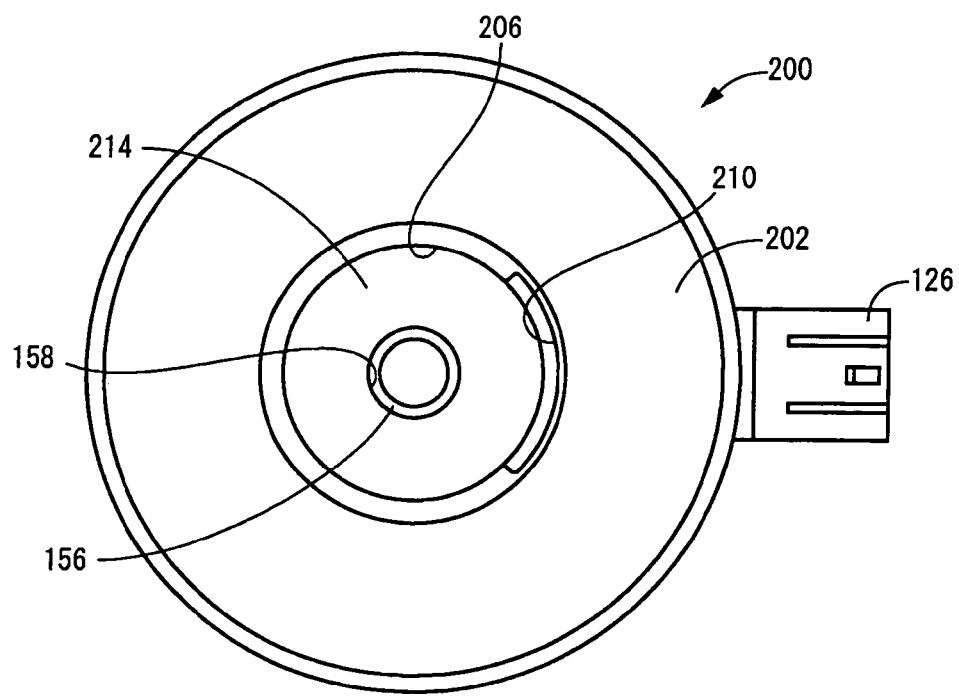
FIG. 8 is a top plane view of the solenoid actuator of FIG. 7.

Referring next to FIG. 7 and FIG. 8, an electromagnetic oscillator 200 serving as the solenoid actuator is shown as a component of an active vibration damping device of construction according to a third embodiment of the invention, wherein wide diameter portions 210, 212 of large diameter dimension are formed overlapping in the circumferential direction, in through-holes 206, 208 bored through the centers of the upper yoke 202 and the lower yoke 204 which form the magnetic path. The armature 214 in this electromagnetic oscillator 200 is of generally tubular shape. By means of this design, the distance between the armature 214 and the magnetic poles 132, 134 formed in the wide diameter portions 210, 212 is greater, and the magnetic force acting on the armature 214 can be made to vary in the circumferential direction. According to this embodiment, there is no change in weight balance due to furnishing the armature 214 with a notch or groove, nor is there any change in outside diameter dimension, so that the guiding action afforded by the guide sleeve 136 can be utilized effectively.

Figure 9:
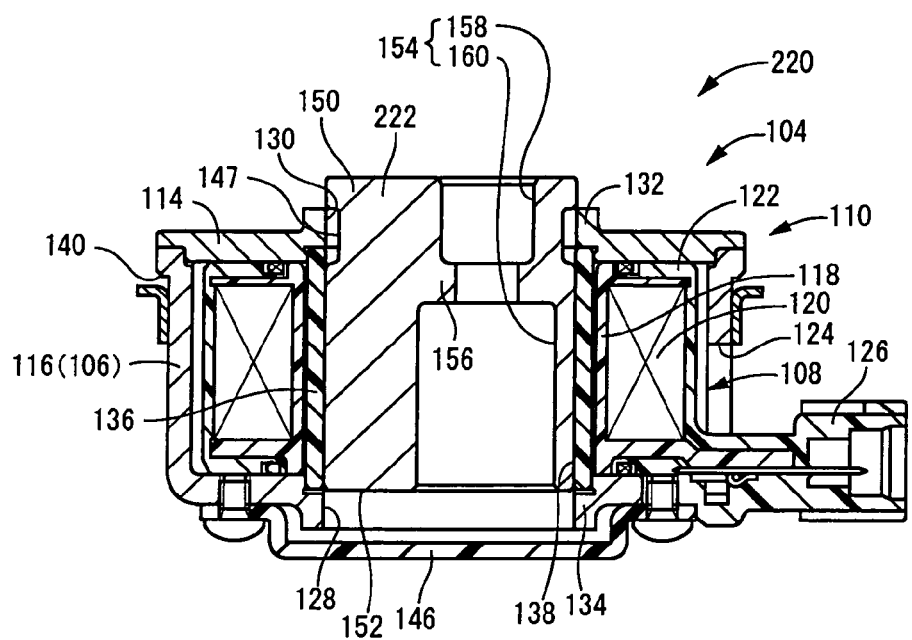
FIG. 9 is an axial cross sectional view of a solenoid actuator used in an active vibration damping device of construction according to a fourth embodiment of the present invention.
Figure 10:
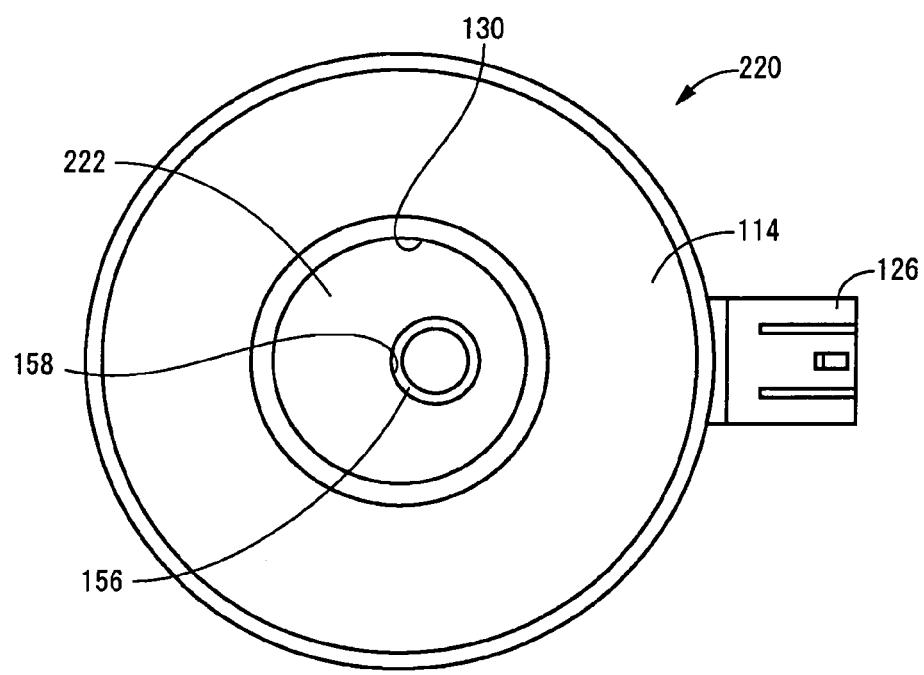
FIG. 10 is a top plane view of the solenoid actuator of FIG. 9.

Referring next to FIG. 9 and FIG. 10, shown is an electromagnetic oscillator 220 serving as the solenoid actuator as a component of an active vibration damping device of construction according to a third embodiment of the invention. In this electromagnetic oscillator 220, the through-hole 154 of the armature 222 is formed at an eccentric location, whereby the number of lines of magnetic force flowing through the armature can be varied in the circumferential direction. With this electromagnetic oscillator 220, it is possible to reduce tilting of the armature, by means of a simple arrangement of forming the through-hole 154 of the armature 222 at an eccentric location.

Figure 11:
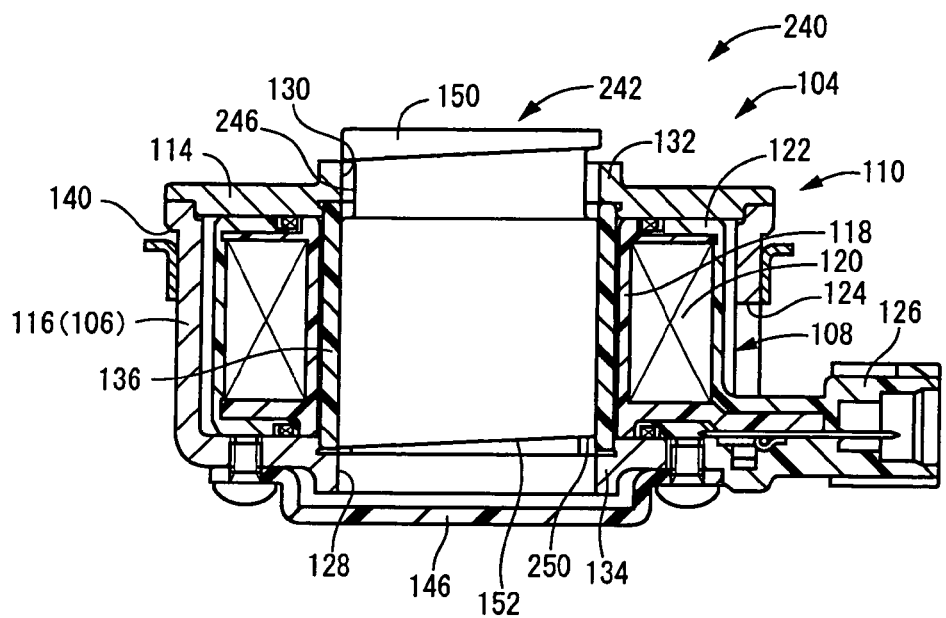
FIG. 11 is an axial cross sectional view of a solenoid actuator used in an active vibration damping device of construction according to a fifth embodiment of the present invention.
Figure 12:
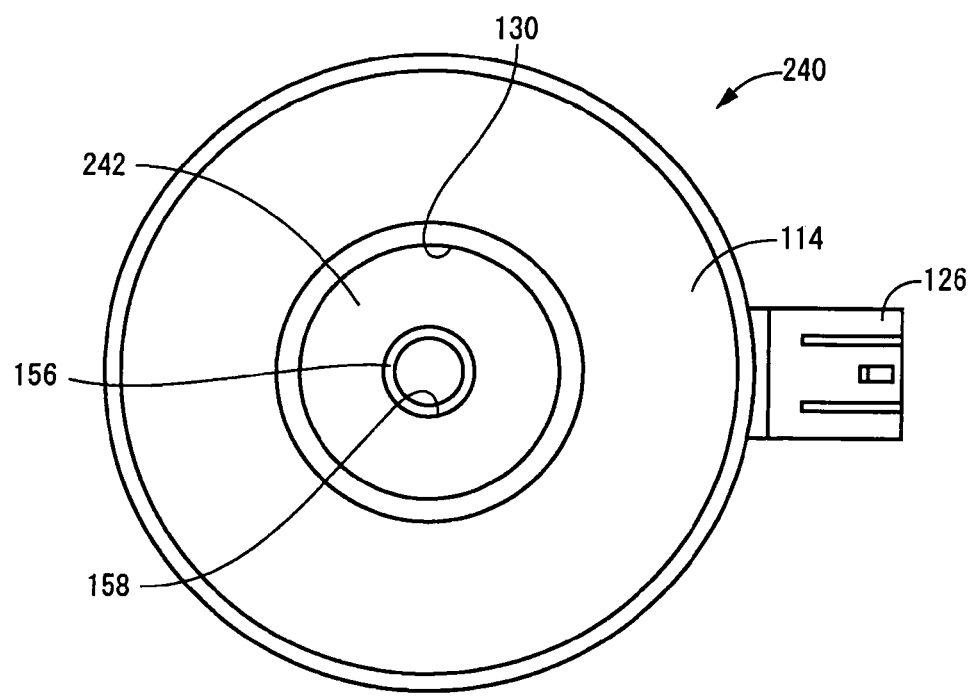
FIG. 12 is a top plane view of the solenoid actuator of FIG. 11.

Referring next to FIG. 11 and FIG. 12, an electromagnetic oscillator 240 serving as the solenoid actuator is shown as a component of an active vibration damping device of construction according to a third embodiment of the invention. The armature 242 in FIG. 11 is shown in exterior view. In this electromagnetic oscillator 240, the groove dimension of a circumferential groove 246 formed in the armature 242 varies in the circumferential direction. At its lower edge, there is formed a shoulder portion 250 whose height dimension varies in the circumferential direction. The height dimension of the lower end face 152 varies in the circumferential direction. The slopes of the circumferential groove 246 and of the shoulder portion 250 are formed with similar slope at overlapping areas in the circumferential direction. By means of this sloped circumferential groove 246 and shoulder portion 250, the distance separating the armature 242 from the upper magnetic pole 132 and the lower magnetic pole 134 and varies in the circumferential direction. In this embodiment in particular, the axial distance between the lower end outside peripheral edge corners of the upper and lower magnetic poles (the upper end portion 150 and the lower end face 152) of the armature 242 and the upper end inside peripheral edge corners of the upper and lower magnetic poles 132, 134—where the armature 242 and the upper and lower magnetic poles 132, 134 are positioned in closest proximity and that dominates in terms of excited magnetic force—varies in the circumferential direction. Accordingly, the distance between the opposing corners varies in the circumferential direction. This change in axial distance separating the opposing corners has a cycle of 360° in the circumferential direction, with the portion where the two corners are closest together and the portion where the two corners are furthest apart being situated in opposition to one another in the axis-perpendicular direction. The distance between the opposed upper magnetic pole 132 and the upper end portion 150 of the armature 242, and the distance between the opposed lower magnetic pole 134 and the lower end face 152 of the armature 242, vary in the same phase as one another, in the circumferential direction.

Additionally, by employing an armature 242 of this shape, change in the distance separating the upper and lower magnetic poles 132, 134 and the armature 242 can be substantially reduced, when the armature 242 undergoes actuated displacement (relative change in axial position of the armature 242 with respect to the upper and lower yokes 114, 116). Specifically, even if the position of closest proximity of the upper end inside peripheral edge corners of the upper and lower magnetic poles 132, 134 and the lower end outside peripheral edge corners of the upper and lower magnetic poles (the upper end portion 150 and the lower end face 152) of the armature 242, which dominate in terms of excited magnetic force (magnetic attracting force), should change gradually in the circumferential direction during actuated displacement of the armature 242, the distance between the upper end inside peripheral edge corners of the upper and lower magnetic poles 132, 134 and the lower end outside peripheral edge corners of the upper and lower magnetic poles of the armature 242 will be kept substantially constant, at least within an amplitude range in the axial direction at the lower end outside peripheral edge corners of the upper and lower magnetic poles of the armature 242. Thus, during actuated displacement of the armature 242, it is possible to suppress a sudden change in magnetic force acting on the armature 242. For this reason, even in the event of variation in the distance separating the armature 242 and the upper and lower magnetic poles 132, 134, due to manufacturing error or to change over time in the support rubber elastic body 54 that supports the armature 242, it is possible to suppress a sudden change in the magnetic acting force, so that stable vibration damping characteristics are achieved over an extended period.

Figure 13:
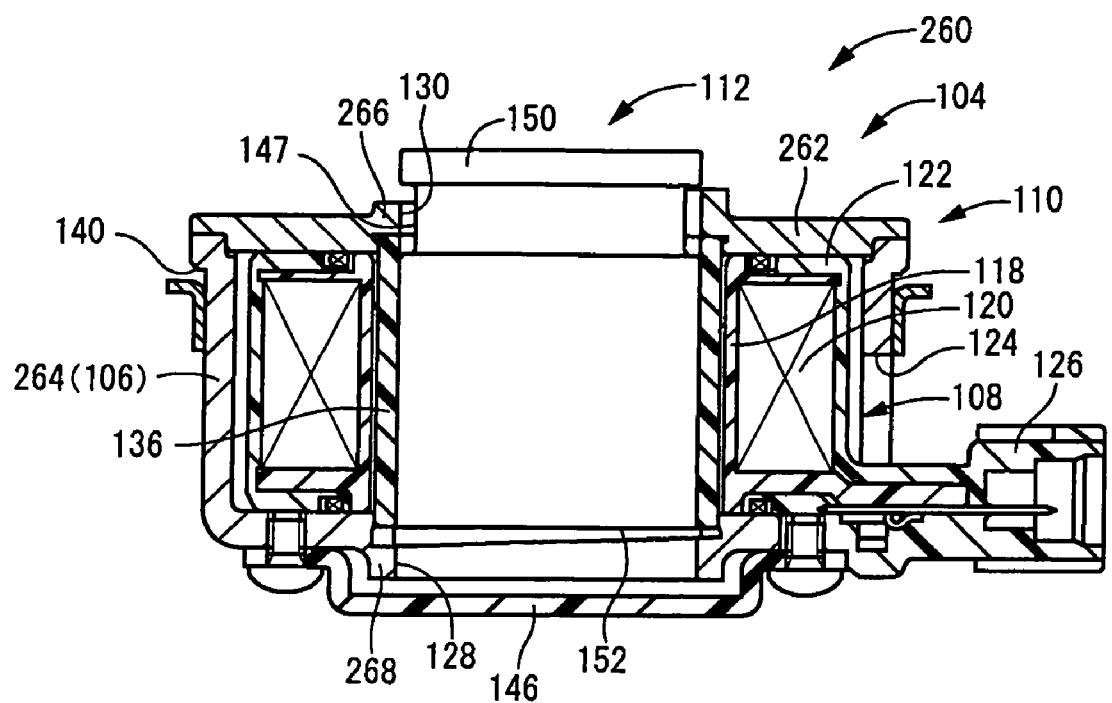
FIG. 13 is an axial cross sectional view of a solenoid actuator used in an active vibration damping device of construction according to a sixth embodiment of the present invention.

FIG. 13 depicts an electromagnetic oscillator 260 serving as the solenoid actuator is shown as a component of an active vibration damping device of construction according to a sixth embodiment of the invention. The armature 112 in FIG. 13 is shown in exterior view. The planar shape of the electromagnetic oscillator 260 is similar to the shape of the electromagnetic oscillator 240 depicted in FIG. 12. In this electromagnetic oscillator 260, the height dimensions of the upper magnetic pole 266 and the lower magnetic pole 268 formed in the upper yoke 262 and the lower yoke 264 differ in the circumferential direction. With regard to the slope of the upper magnetic pole 266 and the lower magnetic pole 268, they have similar slope in areas overlapping in the circumferential direction. By varying the relative position of the upper and lower magnetic poles 266, 268 relative to the armature 112 in the circumferential direction, the magnetic force acting on the armature 112 may be made to vary in the circumferential direction.

While the invention has been shown hereinabove in terms of certain preferred examples, these are merely exemplary, and the invention should in no way be construed as limited to the specific disclosure in the embodiments.

For example, it would be possible to employ as the bias urging assembly a combination of magnetic force biasing mechanism for varying in the circumferential direction the number of lines of magnetic force through the armature, in addition to magnetic force biasing mechanism for varying the distance from the magnetic poles in the circumferential direction. Specifically, by furnishing a through-hole or groove as in the second embodiment depicted in FIG. 5, the number of lines of magnetic force flowing through the armature 112 is varied in the circumferential direction, as well as varying the distance from the magnetic poles in the circumferential direction.

It is of course possible to furnish magnetic force biasing mechanism to both the movable element and the stator. For example, by varying in the circumferential direction the locations of the upper and lower magnetic poles 132, 134 in the first embodiment discussed previously, the distance between the armature 112 and the upper and lower magnetic poles 132, 134 can be made to vary appreciably.

The magnetic force biasing mechanism is not limited to the forms discussed above, and may take other forms, for example, by forming the movable element from a combination of materials having different magnetic permeabilities, to cause the magnetic force acting on the movable element to vary in the circumferential direction.

Additionally, the specific form of the axis-perpendicular direction displacement permitting assembly for permitting relative displacement of the armature 112, the actuating rod 90 and the coil member 108 in the axis-perpendicular direction is not limited to the form described hereinabove. For example, instead of the rubber ring 164, a coil spring could be installed in the compressed state between the stepped face 162 of the actuating rod 90 and the upper end face of the holding portion 161, thereby more actively urging the armature 112 towards the support member 157 side; or further dispensing with the holding portion 161, instead installing a coil spring in the compressed state between the stepped face 162 of the actuating rod 90 and the upper end face of the inward protruding portion 156 of the armature 112. As the means for supporting the armature 112 in a non-detachable manner in the axial direction from the actuating rod 90, it would be possible for example to support the armature 112 by means of forming a male thread on the distal end of the actuating rod 90, and screwing on a nut member having an outside diameter dimension like that of the support member 157, in place of the support member 157.

The bias urging assembly may be realized, for example, with a permanent magnet, spring means employing a rubber elastic body, or the like, instead of magnetic force biasing mechanism as described above. Rather than being installed on the solenoid actuator as in the embodiments described previously, bias urging assembly such as a permanent magnet for exerting bias urging force in the axis-perpendicular direction could instead be disposed on the vibration damping device chassis in which the solenoid actuator installed, on the exciting means thereof, or on the connecting rod (actuating rod) connected to the exciting means.

The present invention is applicable analogously to automotive body mountings and member mountings, as well as to mountings, dampers, and other such vibration damping devices in non-automotive devices of various kinds.

It is also to be understood that the present invention may be embodied with various other changes, modifications and improvements, which may occur to those skilled in the art, without departing from the spirit and scope of the invention defined in the following claims.

What is claimed is:

1. An active vibration damping device comprising:
a first mounting member and a second mounting member, the mounting members attachable respectively to components linked to each other to make up a vibration transmission system;
a main rubber elastic body elastically linking the first and second mounting members, defining one portion of a wall of a pressure receiving chamber having a non-compressible fluid sealed therein;
an oscillation member defining another portion of the wall of the pressure receiving chamber;
a solenoid actuator including: a stator having a coil and a yoke member attached about the coil to form a stator-side magnetic path with a guide hole extending along a center axis thereof; and a movable element positioned inserted into the guide hole of the stator so that actuating force in an axial direction is create between the stator and the movable element by means of supplying electrical current to the coil, the stator of the solenoid actuator being affixed to the second mounting member and the movable element being attached to the oscillation member so as to actively control pressure in the pressure receiving chamber by exciting actuation of the oscillation member; and
a bias urging assembly for urging the movable element in one direction in an axis-perpendicular direction with respect to the stator so that the movable element assumes a generally linear contact with respect to an inside face of the guide hole.

2. An active vibration damping device according to claim 1, wherein the bias urging assembly comprises a magnetic biasing mechanism for biasing to one side in the axis-perpendicular direction a resultant force of magnetic forces excited in the axis-perpendicular direction between the movable element and the stator, by means of supplying electrical current to the coil.

3. An active vibration damping device according to claim 2, wherein the magnetic force biasing mechanism is realized by varying in a circumferential direction a distance between magnetic pole forming areas where magnetic poles are produced in the stator, and magnetic action areas of the movable element subjected to magnetic action by the magnetic poles of the stator.

4. An active vibration damping device according to claim 2, wherein the magnetic force biasing mechanism is realized by varying in a circumferential direction number of lines of magnetic force passing through an interior of at least one of the stator and the movable element.

5. An active vibration damping device according to claim 1, wherein a sliding contact surface for sliding contact by the movable element when the movable element undergoes actuated displacement in the axial direction is disposed on an inside face of the guide hole, in a portion extending a predetermined length in the axial direction.

6. An active vibration damping device according to claim 1, wherein an axis-perpendicular direction displacement permitting assembly for permitting relative displacement of the movable element and the oscillation member in the axis-perpendicular direction is disposed between the movable element in the solenoid actuator, and the oscillation member to which the movable element is attached.

7. An active vibration damping device according to claim 1, wherein an axis-perpendicular direction displacement permitting assembly is constituted by furnishing a connecting rod that projects from the oscillation member to the movable element; forming a mating hole for inserting a projecting distal end portion of the connecting rod in the movable element, and having an inside peripheral face slightly larger than an outside peripheral face of the connecting rod, the connecting rod inserted through the mating hole being positioned in the axial direction to the movable element so as to permit displacement of the connecting rod in the axis-perpendicular direction within the mating hole.

* * * * *